(12) United States Patent
Deck (10) Patent No.: US 6,788,422 B2
(45) Date of Patent: Sep. 7, 2004

(54) METHOD AND APPARATUS FOR USING QUASI-STABLE LIGHT SOURCES IN INTERFEROMETRY APPLICATIONS

(75) Inventor: Leslie L. Deck, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 152 days.

(21) Appl. No.: 10/125,078

(22) Filed: Apr. 17, 2002

(65) Prior Publication Data

US 2002/0176091 A1 Nov. 28, 2002

Related U.S. Application Data (60) Provisional application No. 60/284,312, filed on Apr. 17, 2001.

(51) Int. Cl.[7] .................................................. G01B 9/02
(52) U.S. Cl. ........................................ 356/512; 356/454
(58) Field of Search .................................. 356/512, 454

(56) References Cited

U.S. PATENT DOCUMENTS

| | | | |
|---|---|---|---|
| 4,594,003 A | * | 6/1986 | Sommargren ............... 356/489 |
| 6,249,351 B1 | * | 6/2001 | de Groot .................... 356/512 |
| 6,587,214 B1 | * | 7/2003 | Munks ....................... 356/519 |

OTHER PUBLICATIONS

Ch. 14 of "Optical Shop Testing," 2nd Ed., edited by D. Malacara, J., Wiley and Sons, New York, 1992.

Deck, L.; Multiple Surface Phase Shifting Interferometry, Proc. SPIE, 4451, 424–430 (2001).

Hariharan, P. et al., "Digital phase–shifting interferometry: a simple error–compensating phase calculation algorithm," Apppl. Opt. 26, 2504–2506 (1987).

Schwider, J. et al., "Digital wavefront measuring interferometry: Some systematic error sources," Appl. Opt. 22, 3421–3432 (1983).

* cited by examiner

*Primary Examiner*—Samuel A. Turner
*Assistant Examiner*—Patrick Connolly
(74) *Attorney, Agent, or Firm*—Fish & Richardson P.C.

(57) ABSTRACT

Techniques for performing phase-shifting interferometry are disclosed.

23 Claims, 5 Drawing Sheets

METHOD AND APPARATUS FOR USING QUASI-STABLE LIGHT SOURCES IN INTERFEROMETRY APPLICATIONS

CROSS-REFERENCE TO RELATED APPLICATIONS

This application claims priority from U.S. Provisional Application Ser. No. 60/284,312, entitled "METHOD AND APPARATUS FOR USING QUASI-STABLE RESONATORS AS SOURCES FOR INTERFEROMETRY APPLICATIONS," filed Apr. 17, 2001, which is incorporated herein by reference in its entirety.

BACKGROUND

This invention relates to wavelength-tuning, phase-shifting interferometry.

Interferometric optical techniques are widely used to measure optical thickness, flatness, and other geometric and refractive index properties of precision optical components such as glass substrates used in lithographic photomasks.

For example, to measure the surface profile of a measurement surface, one can use an interferometer to combine a measurement wavefront reflected from the measurement surface with a reference wavefront reflected from a reference surface to form an optical interference pattern. Spatial variations in the intensity profile of the optical interference pattern correspond to phase differences between the combined measurement and reference wavefronts caused by variations in the profile of the measurement surface relative to the reference surface. Phase-shifting interferometry (PSI) can be used to accurately determine the phase differences and the corresponding profile of the measurement surface.

With PSI, the optical interference pattern is recorded for each of multiple phase-shifts between the reference and measurement wavefronts to produce a series of optical interference patterns that typically span a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. Using numerical techniques known in the art, the phase-offset for each spatial location is extracted from the sinusoidal dependence of the intensity values to provide a profile of the measurement surface relative the reference surface. Such numerical techniques are generally referred to as phase-shifting algorithms.

The phase-shifts in PSI can be produced by changing the optical path length from the measurement surface to the interferometer relative to the optical path length from the reference surface to the interferometer. For example, the reference surface can be moved relative to the measurement surface. Alternatively, the phase-shifts can be introduced for a non-zero optical path difference by changing the wavelength of the measurement and reference wavefronts. The latter application is known as wavelength tuning PSI and is described, e.g., in U.S. Pat. No. 4,594,003 to G. E. Sommargren.

Typically, high-stability light sources are desirable in wavelength-tuning PSI applications as instabilities in the light source (e.g., the mode characteristics) can corrupt PSI data. Mode instabilities, or mode-hops as they are commonly known, cause an unknown and random jump in the phase and frequency of the light source. Accordingly, it is not usually possible to extract an accurate phase from corrupted data.

Because PSI measurements are often required to be extremely accurate and repeatable, highly-stable laser light sources are typically used to prevent mode-hops from occurring, or to stabilize the light before it enters the interferometer. Laser diodes are an inexpensive coherent light source whose wavelength can be tuned by e.g., varying the diode current. Unfortunately, laser diodes often exhibit unpredictable long-term operating mode characteristics. The short cavity of the laser diode, its sensitivity to vibration, optical feedback and temperature, and the unpredictability of aging effects can make the mode characteristics of the laser diode difficult to control. Externally stabilizing the output of a laser diode by coupling the laser diode with an external cavity, or carefully controlling the laser diode environment and fixing the operating mode at a well-defined position can sufficiently improve laser diode stability for use in e.g., PSI applications.

SUMMARY

Quasi-stable light sources, such as bare laser diodes, are often overlooked for high-stability applications, like phase-shifting interferometry (PSI). However, the inventors have devised approaches for using a bare laser diode, or other quasi-stable light source, as a source in PSI. Accordingly, the invention is directed to PSI apparatus and methods that utilize non-stabilized light sources, e.g., light sources having mode-instabilities. The inventors have recognized that certain wavelength tunable light sources can be used as a light source for wavelength-tuned interferometers, despite their modal stability. Notably, the inventors have devised PSI implementations wherein laser diodes can be used for interferometric measurements, without the use of additional mode-stabilizing apparatus. In particular, PSI data is acquired regardless of the modal stability of the light. An algorithm, implemented during or after data acquisition, identifies data corrupted by mode instabilities, and eliminates the data from further analysis. Accordingly, the algorithm outputs analyzed data that is free from corruption associated with mode-hops and the like. Moreover, identifying a phase shifting range over which corrupted data sets are collected allows future data to be acquired using a different phase shifting range, potentially avoiding mode instabilities altogether.

In implementations described below, the user accepts that mode hops will occur, rather than trying to fix the operating mode over the use lifetime of the light source. If a controller detects a mod-hop, the controller either changes the light source environment to move the mode-hop out of the wavelength tuning range, or the controller determines the position where the mode-hop occurred and avoids that position during phase processing. These implementations make two assumptions: (i) the range between adjacent mode-hops is larger than the tuning range required by the PSI algorithm for determining a phase; (ii) the light source environment can be changed in sufficiently small increments to move the mode-hop out of the light source tuning range, without moving another mode-hop into the tuning range.

In general, in one aspect, the invention features an interferometry method. The interferometry method includes positioning a measurement surface within an interferometer that derives measurement and reference wavefronts from a tunable coherent light source that exhibits mode-instabilities within a range of wavelengths. The interferometry method further includes measuring an interference signal at each of multiple positions of a series of optical interference patterns produced by the interferometer. Each pattern in the series corresponds to one of multiple wavelengths in the wavelength range of the source. The interferometry method also includes identifying whether a portion of the interference signals is corrupted by a mode-instability in the light source.

Implementations of the interferometry method can include one or more of the following features.

Identifying corrupted portions of the interference signals can include extracting multiple phase values corresponding to different portions of each of at least two of the interference signals. The method can include determining a surface profile corresponding to the different portions. Furthermore, the interferometry can include comparing surface profiles and identifying a corrupt portion based on the comparison. Comparing the surface profiles can include determining a parameter related to a difference between a pair of surface profiles, e.g., the average of the difference at the multiple positions. This parameter can be compared to a noise figure. Comparing the surface profiles can further include comparing the difference between the first mentioned pair of surface profiles to the difference between a second pair of surface profiles.

The interferometry method can include determining a final surface profile from non-corrupted portions of the interference signals. The final surface profile can be determined by averaging surface profiles extracted from the non-corrupted portions of the interference signals.

Each portion of an interference signal can include a series of sequentially measured values, each value corresponding to a respective one of the series of optical interference patterns.

The interferometry method can include ramping from a first wavelength to a second wavelength while measuring the interference signal. The method can also include ramping from the second wavelength to the first wavelength while measuring the interference signal. The interference signal can be phase shifted by an amount sufficient to extract a phase from the interference signal between the first wavelength and the second wavelength. In some embodiments, the interference signal can be phase shifted by an amount sufficient to extract three independent phases from the interference signal between the first wavelength and the second wavelength.

The light source can be a laser, e.g., a laser diode.

The interferometer can be a Fizeau interferometer.

The multiple wavelengths in the wavelength range can be spaced from one another to impart an absolute phase shift between consecutive interference patterns sufficient to extract a phase from each interference signal.

The multiple wavelengths in the wavelength range can be spaced from one another to impart substantially equal phase shifts between consecutive interference patterns.

The interferometry method can include adjusting the light source environment (e.g., the light source temperature) and repeating the measuring and identifying when all when all portions of the interference signal are corrupted.

In another aspect, the invention features an interferometric system, including an interferometer having a mount to position a measurement object relative a reference surface and configured to receive light from a tunable light source and generate an optical interference pattern. The interference pattern includes a superposition of a measurement wavefront of a measurement beam reflected from a surface of the measurement object and a reference wavefront of a reference beam reflected from the reference surface. The interferometric system also includes a detector configured to record an interference signal at multiple locations of the optical interference pattern generated by the interferometer, and a system controller connected to the light source and the detector. During operation, the controller causes the light source to generate light at each of multiple wavelengths, causes the detector to record the interference signals for each of the multiple wavelengths, and implements an algorithm to identify whether a portion of the interference signals is corrupted by a mode-instability in the light source.

Embodiments of the interferometric system can be configured to implement any of the methods, or have any of the features, corresponding to those described with reference to the aforementioned aspect of the invention.

Embodiments of the invention can include one or more of the following advantages. Embodiments of the invention can enable the use of bare single-mode laser diodes in phase-shifting interferometry applications. The overall economy of manufacture of interferometric devices can be improved by using inexpensive light sources, with little or no additional hardware. The wavelength of a light source used in wavelength-tuning PSI can be tuned via current tuning. Interferometric systems can acquire useful data in the presence of mode-instabilities in their light source. Moreover, in some embodiments, if only one mode-hop occurs during any data acquisition, a measurement is produced every time a user initiates a measurement sequence. Interferometric systems can detect when mode instabilities occur, and can automatically correct for their occurrence. Furthermore, interferometric systems can reduce random errors during surface profiling due to averaging.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control. In addition, the apparatus, methods, and examples are illustrative only and not intended to be limiting.

Additional features, objects, and advantages of the invention will be apparent from the following detailed description and drawings, and from the claims.

DETAILED DESCRIPTION

Phase shifting interferometry (PSI) techniques are used to make high accuracy surface-profile and other interferometry measurements in which stability of the light source is essential for acquisition of useful data. In some applications of PSI, an optical wavelength modulation is used in an unequal path length interferometer (e.g., a Fizeau interferometer) to generate phase shifts between each acquired interference image. The phase shift between each image results in an intensity change at each detector pixel related to the phase shift. Typically, any mode instability in the light source causes a random, discontinuous change in light intensity, which corrupts the expected sinusoidal intensity change associated with phase shifting. Accordingly, data acquired in the presence of light source mode instabilities is detrimental to corresponding PSI data. However, the inventors have recognized that it is possible to identify PSI data corrupted by mode instabilities during and/or after acquisition. Accordingly, the invention features methods and systems for performing wavelength-tuning phase shifting interferometry in the presence of light source mode instabilities. These methods relax stability specifications of the light source, which typically should be sufficiently stable to prevent mode instabilities from occurring during the phase shifting. Moreover, this relaxed stability requirement can enable the use of quasi-stable light sources in reliable PSI systems. Quasi-stable light sources are light sources that can have mode instabilities during wavelength tuning. An embodiment of such as system is described below.

Figure 1:
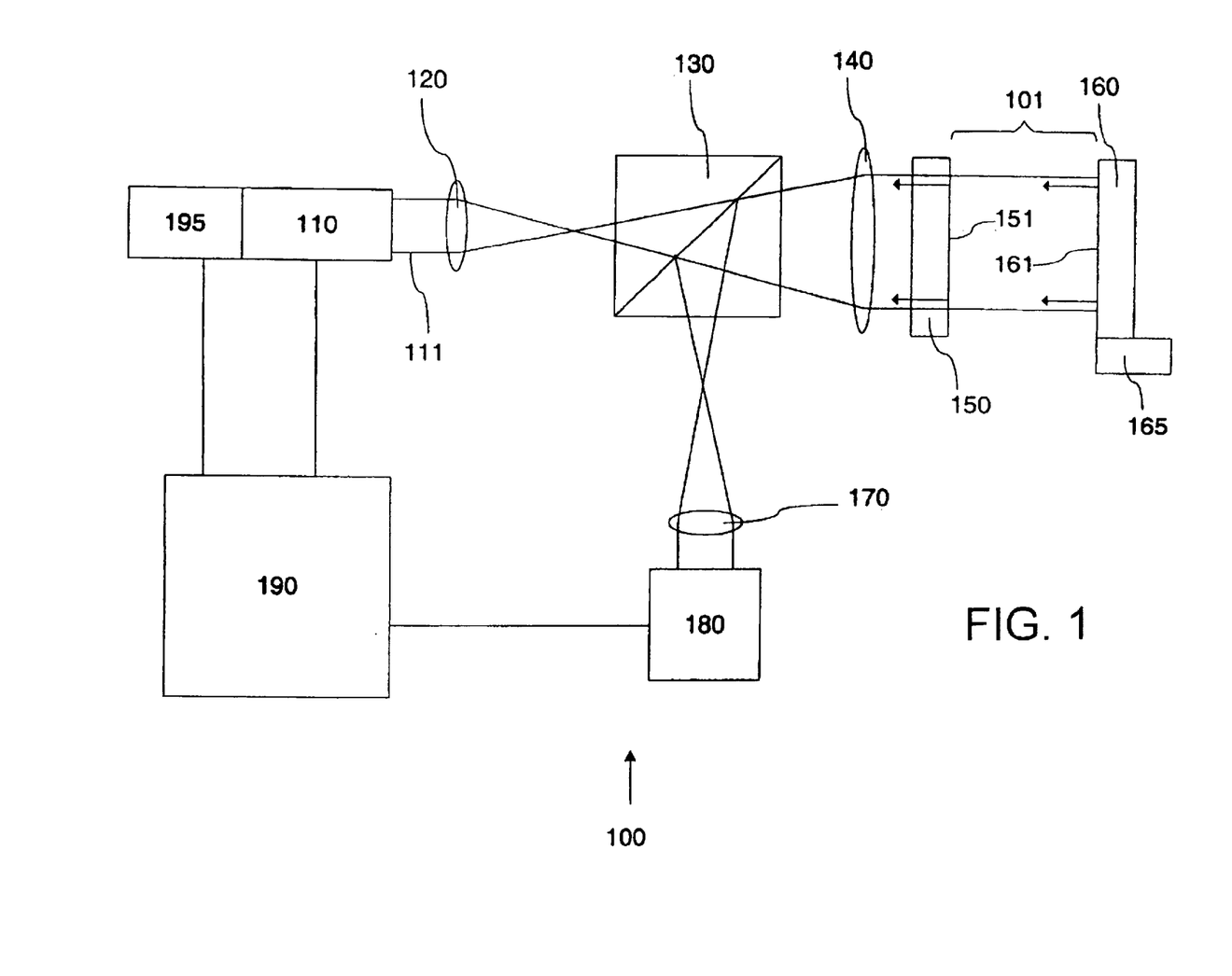
FIG. 1 is a schematic diagram of an embodiment of an interferometry system.

A Fizeau interferometer 101 is shown as part of interferometry system 100 in FIG. 1. System 100 is adapted to measure the profile of a measurement surface 161 of a measurement object 160. In addition to Fizeau interferometer 101, system 100 includes a mount 165 for positioning measurement object 160 relative to a reference surface 151 of a reference flat 150. System 100 also includes an electronic controller 190, such as a computer. Additionally, system 100 includes a tunable quasi-stable light source, such as a laser diode 110. Controller 190 is connected to laser 110 and adjusts the wavelength of its output by varying the light source drive current. Additional optical components included in system 100 are a beam splitter 130, collimating optics 120 and 140, an imaging optic 170, a CCD camera 180, including a frame grabber for storing images detected by the camera. Controller 190 adjusts the wavelength $\lambda$ of laser diode 110 by an amount $\Delta\lambda$ about a nominal wavelength of $\lambda_0$ between image acquisitions (i.e., $\lambda=\lambda_0+\Delta\lambda$, where $\Delta\lambda<<\lambda$). While the back surface of reference flat 150 defines reflective reference surface 151 for the interferometer, front surface 152 of reference flat 150 has an antireflection coating and may be additionally or alternatively tilted with respect to back surface 151, so that reflections from front surface 152 do not take part in any subsequent measurements.

During operation, laser diode 110 directs light 111 at a wavelength $\lambda$ to beam splitter 130, which then directs the light to collimating lens 140 to collimate the light into a plane field. Reference surface 151 reflects a first portion of the light to form a reference wavefront 201, and measurement surface 161 of measurement object 150 reflects an additional portion of the light to form a measurement wavefront 210. Lenses 140 and 170 then image wavefronts 201 and 210 onto CCD camera 180 where they form an optical interference image. The frame grabber of camera 180 records an array of voltage values corresponding to the intensity of the optical interference image at each pixel.

Controller 190 communicates with camera 180 and laser diode 110, synchronizing the detection of illumination by CCD camera 180 with the electrical current driving laser diode 110. During operation, controller 190 stabilizes the laser diode temperature at a first position using a thermoelectric cooler 195 coupled to the laser diode. Once the laser diode is thermally stabilized, controller 190 varies the laser diode drive current through a range of current values.

Figure 2:
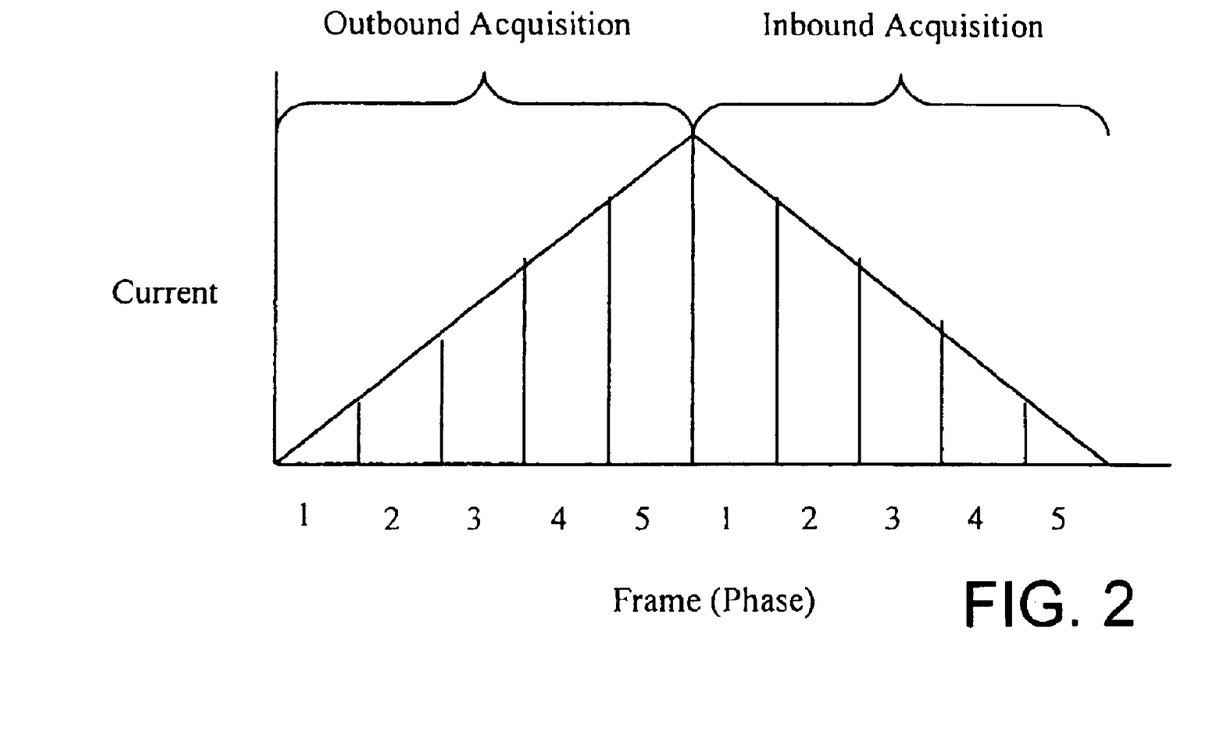
FIG. 2 is a plot of drive current vs. acquisition frame for an acquisition profile.
Figure 3:
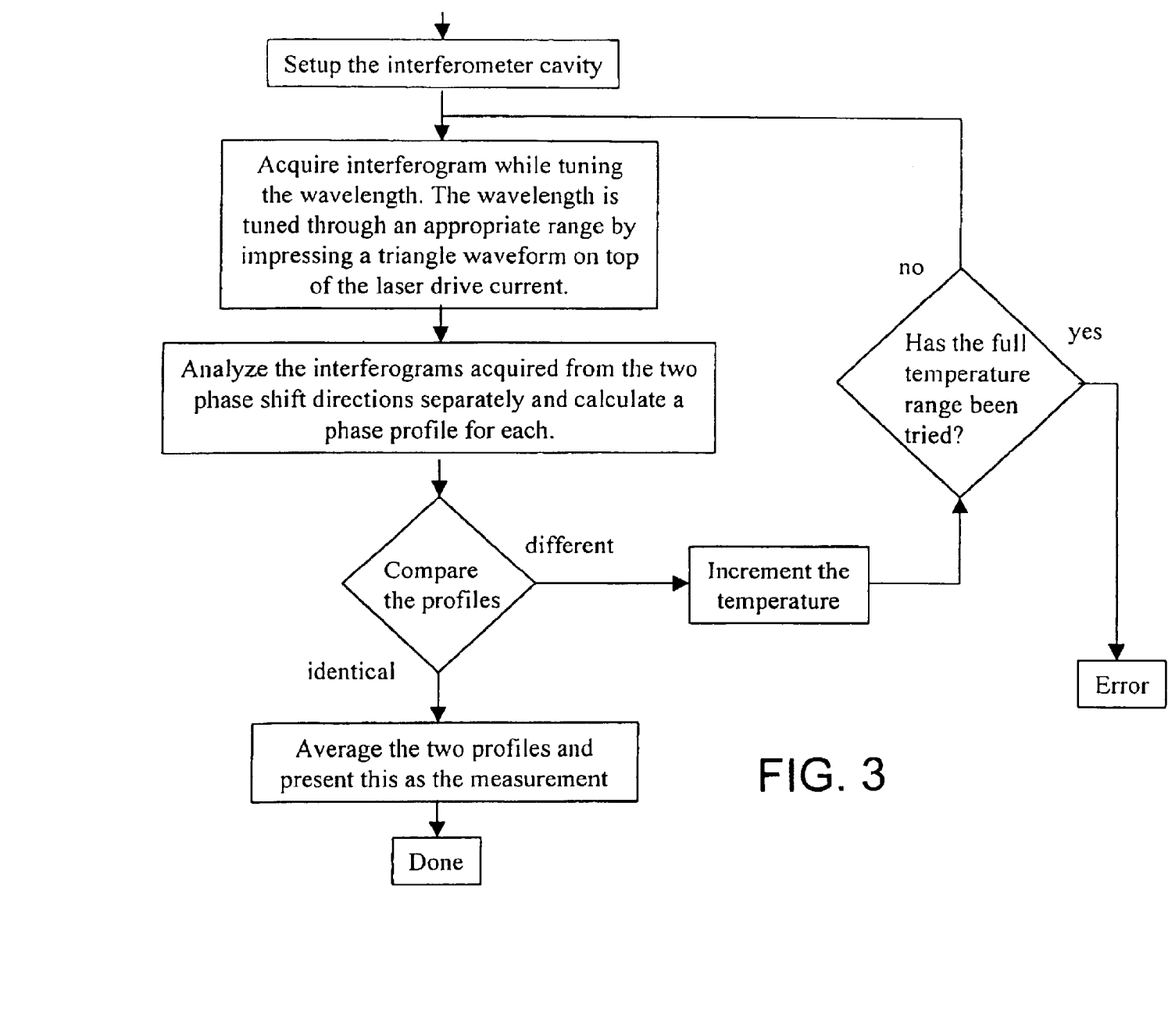
FIG. 3 is a flowchart showing an algorithm for analyzing data acquired using the acquisition profile shown in FIG. 2.

Referring to FIG. 2, the laser diode drive current is ramped linearly from a minimum current value to a maximum current value, and then back to the minimum current value. As the laser diode output wavelength depends on drive current, the current ramp causes the output wavelength to shift between a minimum and maximum wavelength value, shifting the phase of the optical interference image. In the present embodiment, the laser diode and controller are pre-calibrated to provide a phase-shift of approximately $2\pi$ between the minimum and maximum wavelength. During the shifting, the camera acquires a series of frames at equally spaced wavelength intervals during the scan. The controller acquires a first data set from the camera, consisting of five frames, while ramping the current up. The controller acquires a similar data set, also consisting of five frames, while ramping the current down. As the frames are acquired at equally-spaced wavelength intervals, there is an approximately a $\pi/2$ phase shift between each frame. Thus, controller 190 acquires an interference signal consisting of two portions from each CCD pixel. Each portion consists of five data points. The data is acquired even if the light source is unstable. Therefore, the controller initiates an algorithm to establish whether or not the data has been corrupted by mode instabilities. In the event that no corruption is detected, the controller determines a surface profile for measurement surface 161. FIG. 3 summarizes both data acquisition and analysis in a flow chart. The analysis for determining whether data is corrupted proceeds as follows.

Controller 190 extracts a phase from each portion of each interference signal, i.e., the first portion corresponds to the data recorded while ramping up from the minimum to maximum wavelength, and the second portion corresponds to the data recorded while ramping down. The controller extracts a phase from each portion using a five-frame algorithm. An example of a five-frame algorithm is described by P. Hariharan et al. in "Digital Phase-Shifting Interferometry: A Simple Error-Compensating Phase Calculation Algorithm," *Appl. Opt.*, 26, 2504, (1987). In the present embodiment each portion consists of five sequentially-recorded data points, and correspondingly a five-frame algorithm is used to extract a phase from each portion. More generally, a portion refers to any data set from which a phase can be extracted. Typically, the number of data points, the sequence in which the data points are recorded, and the relative phase shift between each data point will depend on the particular phase-shifting algorithm. For example, a thirteen frame algorithm, such as described in U.S. Pat. No. 5,473,434 to Peter de Groot, would use thirteen data points in each portion. Examples of other PSI algorithms than can be used include those described in *Optical Shop Testing*, $2^{nd}$ Ed., edited by Daniel Malacara, John Wiley & Sons (1992). Additionally, the wavelength-tuning profile, which is linear for each interference signal portion described above, can be any profile, and is usually dictated by the particular PSI algorithm. For example, the wavelength-tuning profile can be linear or non-linear, such as quadratic or logarithmic.

Each phase profile, $\phi(x,y)$, is related to the surface height, $h(x,y)$, of measurement surface by $$h(x, y)=\lambda\phi(x,y)2\pi$$

where $\lambda$ is the wavelength of the laser diode, and x and y refer to the pixel location. Note that the phase profile, $\phi(x,y)$ is the AC component of the cavity phase at each location. In other words, since we are interested in the variation in phase from pixel location to pixel location, and not the absolute phase, a DC component is subtracted from the cavity phase at each position to yield $\phi(x,y)$. Using the relationship between $h(x,y)$ and $\phi(x,y)$, controller 190 determines a surface profile for each portion. The two surface profiles obtained from the two interference data portions are then compared as follows. The controller subtracts the value at each pixel location in the first profile from the value at the same location in the second profile to yield a difference value. The difference value is averaged over all the pixels and compared to a noise figure. The noise figure is a predetermined range within which any uncertainty in the profile measurement due to stochastic error sources is likely to fall. In other words, if each portion yields the same phase profile (to within experimental error), the difference value average will be less than the noise figure. In this case, the controller concludes that no mode hops occurred during the wavelength scan. The controller averages the surface profile profiles yielding a final surface profile for measurement surface 161.

In the alternative, when the difference value is greater than the noise figure, the controller concludes that a mode hop has occurred during the scan. The controller discards the surface profiles determined from the first and second data sets, and adjusts the temperature of the laser diode to a new temperature setting using the thermoelectric cooler. Once the laser diode has stabilized, the measurement process is repeated and two new data sets are acquired. The controller analyzes the two new data sets and determines two new measurement surface profiles.

Without limiting the invention in any way, we note that there are theoretical reasons why it is unlikely that the difference between two phase profiles would be less than the noise figure in the presence of mode-hops, even if the instability should occur during both ramping up and ramping down the current. These effects include asymmetrical mode-hop position, chaotic phase behavior during a mode-hop, and inherent hysteresis in the laser diode cavity environment.

Figure 4:
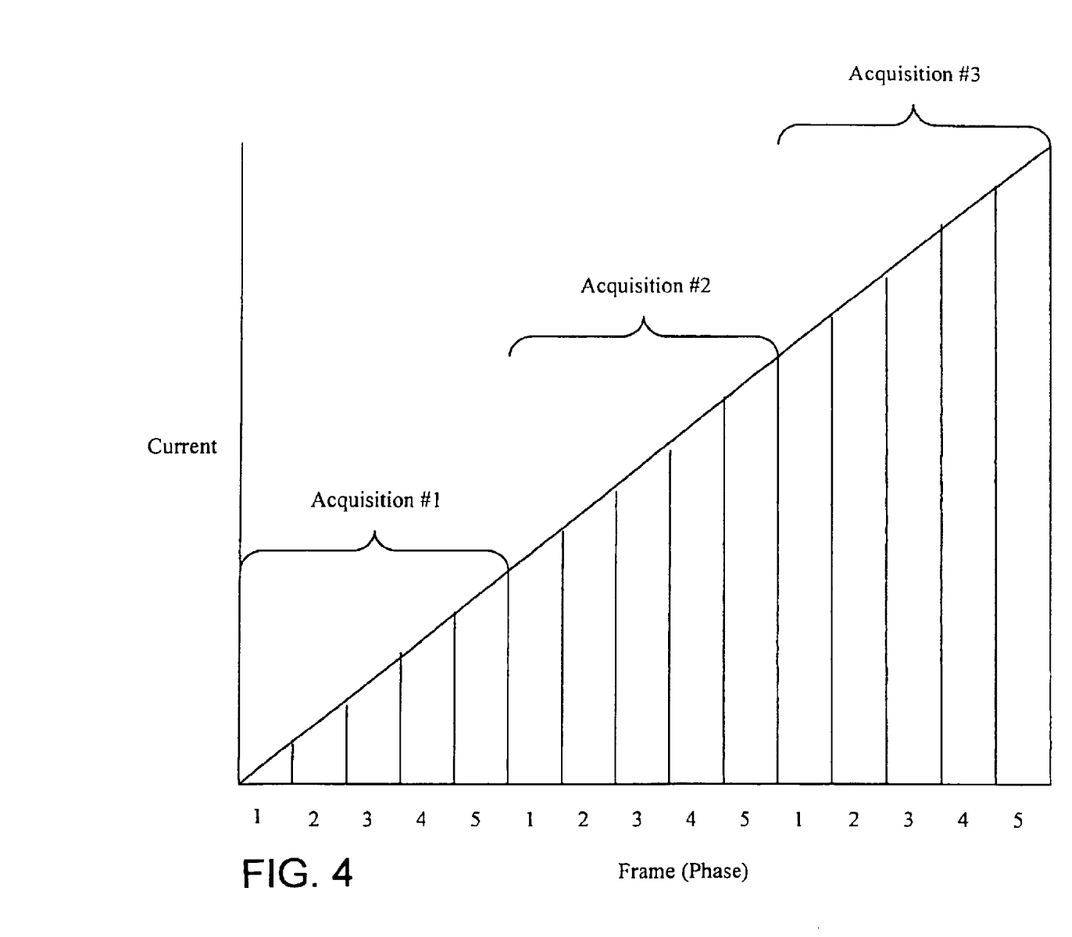
FIG. 4 is a plot of drive current vs. acquisition frame for another acquisition profile.

In another implementation, the apparatus shown in FIG. 1 is used to determine a surface map of measurement surface 161 as follows. Phase-shifting is again accomplished by tuning the wavelength of laser diode 110. Referring to FIG. 4, controller 190 ramps the laser diode drive current from a minimum current value to a maximum current value at a constant rate. Camera 180 acquires fifteen frames at equal time intervals through the scan. In accordance with the PSI five-frame phase extraction algorithm, each frame is acquired with the interference signal phase shifted by $\pi/2$ between each successive sample. The acquired data corresponds to three back-to-back portions (frames 1–5, 6–10, and 11–15, respectively), from which the controller calculates three independent surface profiles. In other words, the data used to determine each surface profile is independent so that any mode hop contaminates one surface profile measurement only.

Figure 5:
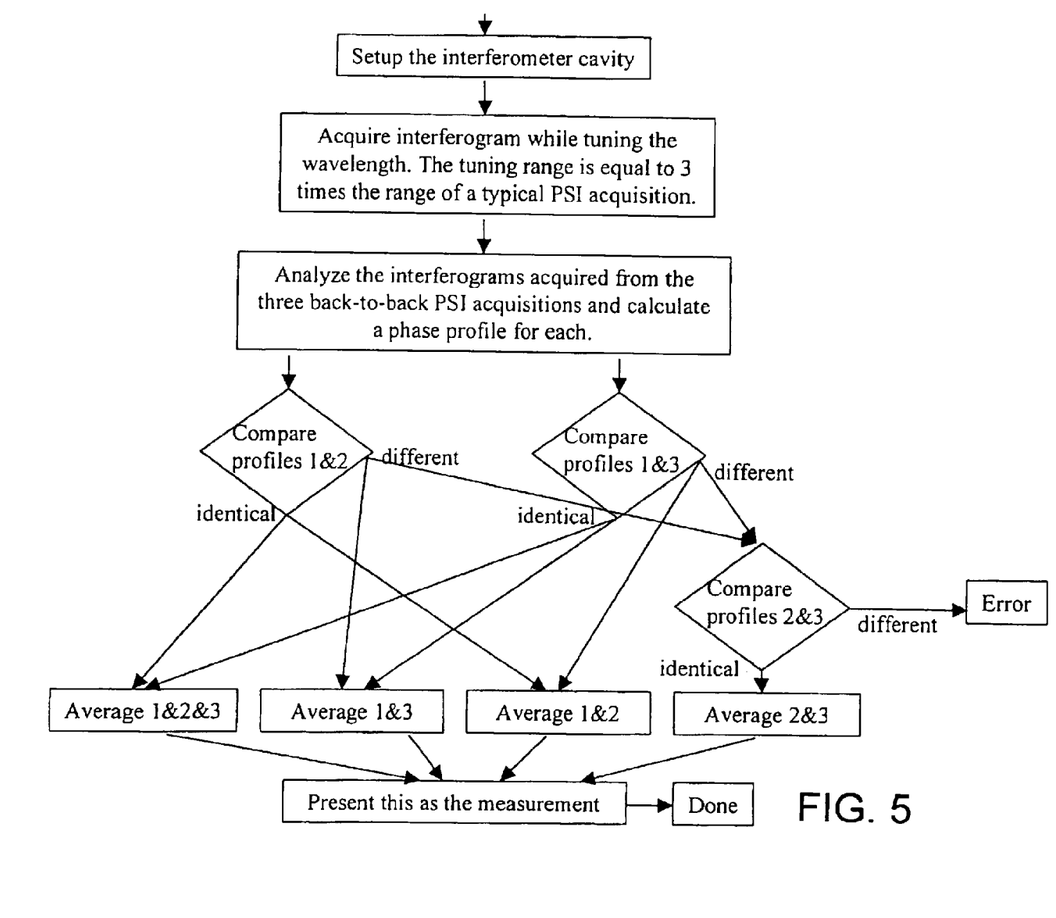
FIG. 5 is a flowchart showing an algorithm for analyzing data acquired using the acquisition profile shown in FIG. 4.

For each pair of surface profiles, the controller calculates a difference between the surface profiles at each pixel. This yields three difference values for each pixel, i.e., three difference value arrays. From this, the controller averages the difference values in each array over the pixels to determine three difference value averages—corresponding to each pair of surface profiles.

Next, the controller compares each difference value average. If all three difference values are less than the noise figure, then the controller concludes that no mode-hops occurred during the scan and all data sets can be used in the final surface profile calculation. The controller averages the surface profiles at each pixel location, yielding a final surface profile for measurement surface 161.

If one of the difference values is less than the noise figure, the pair of phase profiles used to calculate this difference value is averaged at each pixel to yield the final phase profile. The controller determines the surface phase profile from the final phase profile. The data set common to the phase profile pairs greater than the noise figure is discarded.

If none of the difference values are greater than the noise figure, or if there is any degree of ambiguity in the difference values (e.g., if two of the difference values are greater than the noise figure), then the controller changes the laser diode temperature setting and the measurement is repeated. This procedure is repeated until an unambiguous surface profile measurement is obtained, or until the full temperature range of the laser diode has been explored. The latter case is only likely to occur in the event of a serious problem, such as too much optical feedback or a defective laser diode. In this case, the controller returns an error message to the user.

While the foregoing description details algorithms in which the difference between surface profiles is averaged over the pixel locations to provide a surface profile difference average to compare to the noise figure, any metric can be used to compare the surface profiles. For example, any statistical measure of the surface profile difference, such as the standard deviation of the surface profile difference, or a weighted average of the surface profile difference, can be compared to a threshold value. More generally, any function of the surface profiles (e.g., the difference, ratio, or other function) can be used to compare the profiles. Accordingly, the value determined by the comparison function can be compared to a corresponding threshold value (e.g., noise figure) to determine if the data is corrupted. For example, a weighted-average of each surface profile can be determined and the ratio of weighted averages can be compared to a threshold ratio to determine whether the data is corrupted. In general, as long as the metric has sufficient discriminatory power to differentiate between truly corrupt data and anomalous pixels (typically called spikes or "wingers"), which can occur in surface profile measurements, often at the image edges. Alternatively, or additionally, such localized anomalies can be removed from each surface profile prior to finding the surface profile difference (or other comparison function).

Although the aforementioned embodiments include measurement sequences for recording interference signals with two and three portions, respectively, measurement sequences can measure interference signals that include any number of portions. For example, a measurement sequence can include measuring interference signals having more than three portions, such as four, five, six or more portions.

PSI system 100 in FIG. 1 includes a laser diode as a light source. More generally, any light source having a tunable wavelength can be used. Provided the range between adjacent mode hops in the light source is larger than the required operating tuning range for the chosen PSI algorithm, and the light source environment (e.g., temperature) can be changed in sufficiently small increments to move any mode-hop out of the light source tuning range, without moving another mode-hop into the tuning rage, the algorithm can be used to reliably determine the surface profile, and/or other parameter of a measurement object/optical cavity.

Moreover, while PSI system 100 includes a thermoelectric cooler to change the temperature of the laser diode to move the diode from unstable operating regime, the laser diode environment can also be changed in other ways. For example, the diode can be mechanically-strained using a piezoelectric transducer. In general, any environmental parameter can be adjusted sufficient to change the modal behavior of the laser diode.

Furthermore, although PSI system 100 in FIG. 1 included a Fizeau interferometer, other embodiments can employ an interferometer of a different type such as Twyman-Green, Mach-Zehnder, Michelson, Fabry-Perot, and grazing-incidence or unbalanced Mirau. Also, the interferometer can be a large aperture, microscope, or fiber optic sensor interferometer.

Moreover, the measurement object can take on many forms. For example, the measurement object can be an optical flat, a photomask, a flat-panel display, or a silicon wafer (which could involve infrared illumination). Furthermore, the measurement object can be a cemented optic or an air-spaced optical assembly. The measurement object can also be or include a spherical or aspherical dome, contact lens, meniscus lens, or spectacle lens. Typically, the measurement object is transparent or partially transparent at the wavelength of the light source. More generally, the measurement object is any structure, e.g., micro-machined silicon, that offers optical information relating to surface and/or bulk features of the object. This optical information can relate to the topography of a selected surface of the measurement object or to the optical profile including refractive index homogeneities of all or a selected portion of the measurement object.

In any of the embodiments described above, the computer can include hardware, software, or a combination of both to control the other components of the system and to analyze the phase-shifted images to extract the desired information about the measurement object. The analysis described above can be implemented in computer programs using standard programming techniques. Such programs are designed to execute on programmable computers each comprising a processor, a data storage system (including memory and/or storage elements), at least one input device, at least one output device, such as a display or printer. The program code is applied to input data (e.g., phase-shifted images from a CCD camera) to perform the functions described herein and generate information (e.g., the topography of a selected surface), which is applied to one or more output devices. Each computer program can be implemented in a high-level procedural or object-oriented programming language, or an assembly or machine language. Each such computer program can be stored on a computer readable storage medium (e.g., CD ROM or magnetic diskette) that when read by a computer can cause the processor in the computer to perform the analysis described herein.

A number of embodiments of the invention have been described. Nevertheless, it will be understood that various modifications may be made without departing from the spirit and scope of the invention. Accordingly, other embodiments are within the scope of the following claims.

What is claimed is:

1. An interferometry method, comprising:
    positioning a measurement surface within an interferometer that derives measurement and reference wavefronts from a tunable coherent light source that exhibits mode-instabilities within a range of wavelengths;
    measuring an interference signal at each of multiple positions of a series of optical interference patterns produced by the interferometer, wherein each pattern in the series corresponds to one of multiple wavelengths in the wavelength range of the source; and
    identifying whether a portion of the interference signals is corrupted by a mode-instability in the light source.

2. The interferometry method of claim 1, wherein identifying corrupted portions of the interference signals includes extracting multiple phase values corresponding to different portions of each of at least two of the interference signals.

3. The interferometry method of claim 2, further comprising determining a surface profile corresponding to the different portions.

4. The interferometry method of claim 3, further comprising comparing surface profiles and identifying a corrupt portion based on the comparison.

5. The interferometry method of claim 4, wherein comparing the surface profiles comprises determining a parameter related to a difference between a pair of surface profiles.

6. The interferometry method of claim 5, wherein comparing the surface profiles further comprises comparing the parameter to a noise figure.

7. The interferometry method of claim 6, wherein the parameter is the average of the difference at the multiple positions.

8. The interferometry method of claim 5, wherein comparing the surface profiles further comprises comparing the difference between the first mentioned pair of surface profiles to the difference between a second pair of surface profiles.

9. The interferometry method of claim 1, further comprising determining a final surface profile from non-corrupted portions of the interference signals.

10. The interferometry method of claim 9, further comprising averaging surface profiles extracted from the non-corrupted portions of the interference signals to determine the final surface profile.

11. The interferometry method of claim 1, wherein each portion of an interference signal comprises a series of sequentially measured values, each value corresponding to a respective one of the series of optical interference patterns.

12. The interferometry method of claim 1, comprising ramping from a first wavelength to a second wavelength while measuring the interference signal.

13. The interferometry method of claim 12, further comprising ramping from the second wavelength to the first wavelength while measuring the interference signal.

14. The interferometry method of claim 12, wherein the interference signal is phase shifted by an amount sufficient to extract a phase from the interference signal between the first wavelength and the second wavelength.

15. The interferometry method of claim 12, wherein the interference signal is phase shifted by an amount sufficient to extract three independent phases from the interference signal between the first wavelength and the second wavelength.

16. The interferometry method of claim 1, wherein the light source is a laser.

17. The interferometry method of claim 16, wherein the laser is a laser diode.

18. The interferometry system of claim 1, wherein the interferometer is a Fizeau interferometer.

19. The interferometry system of claim 1, wherein the multiple wavelengths in the wavelength range are spaced from one another to impart an absolute phase shift between consecutive interference patterns sufficient to extract a phase from each interference signal.

20. The interferometry system of claim 1, wherein the multiple wavelengths in the wavelength range are spaced from one another to impart substantially equal phase shifts between consecutive interference patterns.

21. The interferometry method of claim 1, further comprising adjusting the light source environment and repeating the measuring and identifying when all when all portions of the interference signal are corrupted.

22. The interferometry method of claim 21, wherein adjusting the light source environment includes adjusting the light source temperature.

23. An interferometric system, comprising:

an interferometer comprising a mount to position a measurement object relative a reference surface and configured to receive light from a tunable light source and generate an optical interference pattern comprising a superposition of a measurement wavefront of a measurement beam reflected from a surface of the measurement object and a reference wavefront of a reference beam reflected from the reference surface;

a detector configured to record an interference signal at multiple locations of the optical interference pattern generated by the interferometer; and a system controller connected to the light source and the detector and which during operation causes the light source to generate light at each of multiple wavelengths, causes the detector to record the interference signals for each of the multiple wavelengths, and implements an algorithm to identify whether a portion of the interference signals is corrupted by a mode-instability in the light source.

* * * * *

UNITED STATES PATENT AND TRADEMARK OFFICE
CERTIFICATE OF CORRECTION

PATENT NO. : 6,788,422 B2
DATED : September 7, 2004
INVENTOR(S) : Leslie L. Deck It is certified that error appears in the above-identified patent and that said Letters Patent is hereby corrected as shown below:

Title page,
Item [56], References Cited, OTHER PUBLICATIONS, "Hariharan" reference, replace "Apppl." with -- Appl. --

Column 11,
Line 1, delete second occurrence of "when all"

Signed and Sealed this

Seventh Day of June, 2005

JON W. DUDAS
*Director of the United States Patent and Trademark Office*